(12) United States Patent
Milcheck

(10) Patent No.: US 10,968,365 B1
(45) Date of Patent: *Apr. 6, 2021

(54) FORMULATION TO STOP THE ADHERENCE OF A DYE TO AN EGGSHELL, IMPROVEMENT

(71) Applicant: Kevin James Milcheck, Mount Dora, FL (US)

(72) Inventor: Kevin James Milcheck, Mount Dora, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/501,390

(22) Filed: Apr. 4, 2019

Related U.S. Application Data

(60) Provisional application No. 62/761,870, filed on Apr. 9, 2018.

(51) Int. Cl.
| | |
|---|---|
| *A23B 5/06* | (2006.01) |
| *C09D 191/06* | (2006.01) |
| *C09D 5/00* | (2006.01) |
| *C09J 191/06* | (2006.01) |
| *C09J 11/06* | (2006.01) |
| *A23L 5/41* | (2016.01) |
| *C09D 7/63* | (2018.01) |

(52) U.S. Cl.
CPC .............. *C09D 191/06* (2013.01); *A23B 5/06* (2013.01); *A23L 5/41* (2016.08); *C09D 5/008* (2013.01); *C09D 7/63* (2018.01); *C09J 11/06* (2013.01); *C09J 191/06* (2013.01); *A23V 2002/00* (2013.01)

(58) Field of Classification Search
USPC ......... 106/271; 426/250; 427/259, 272, 274; 156/86
See application file for complete search history.

(56) References Cited

U.S. PATENT DOCUMENTS

| | | | | |
|---|---|---|---|---|
| 11,829,689 | * | 11/1930 | Townley et al. ......... | B05D 1/32 128/15 |
| 1,829,645 A | * | 10/1931 | Gibbens ................... | B05D 1/32 8/483 |
| 1,829,689 A | * | 10/1931 | Townley ................... | B05D 1/32 426/300 |
| 1,952,612 A | * | 3/1934 | Sherwood ................. | B44D 2/00 426/250 |
| 2,074,376 A | * | 3/1937 | Dorcey .................... | B44D 2/00 426/250 |
| 2,593,566 A | * | 4/1952 | Kamp .................... | C09D 189/06 106/144.1 |
| 3,988,834 A | * | 11/1976 | Anderson ............... | B43L 13/00 33/21.1 |
| 4,371,555 A | * | 2/1983 | Tully ....................... | A23L 15/00 426/104 |
| 4,419,103 A | * | 12/1983 | Balkan .................... | B05C 11/08 118/18 |
| 4,531,475 A | * | 7/1985 | Thill ....................... | B05C 17/08 101/126 |
| 4,664,925 A | * | 5/1987 | McShane ................. | A23L 15/30 426/104 |
| 4,798,162 A | * | 1/1989 | Nelson .................... | B05C 3/09 118/26 |
| 4,853,240 A | * | 8/1989 | McShane ................. | A23L 5/40 426/250 |
| 4,967,687 A | * | 11/1990 | McShane ................. | B05C 17/00 118/13 |
| 5,063,871 A | * | 11/1991 | Chambers ............. | B05C 13/025 118/13 |
| 5,074,239 A | * | 12/1991 | Law ........................ | B44D 3/00 118/26 |
| 5,565,229 A | * | 10/1996 | Mandle ................... | B44D 3/00 426/250 |
| 5,693,352 A | * | 12/1997 | Vogel Goodman ...... | B44D 2/00 118/13 |
| 5,787,838 A | * | 8/1998 | Abrams ................. | B65D 31/02 118/13 |
| 5,895,679 A | * | 4/1999 | Pender ................... | A47G 19/28 118/13 |
| 6,045,592 A | * | 4/2000 | Paquin .................... | D06P 1/445 434/84 |
| 6,110,514 A | * | 8/2000 | Powers ................... | B44D 3/00 426/104 |
| 6,260,480 B1 | * | 7/2001 | Bardeen ................. | A47J 43/14 99/495 |
| 6,386,138 B1 | * | 5/2002 | Schramm ............... | A63H 33/28 118/13 |
| 6,851,883 B1 | * | 2/2005 | Lamond ................... | B43K 8/02 401/198 |
| 8,474,464 B2 | * | 7/2013 | Smith ................... | A45D 34/042 132/200 |
| 9,446,623 B2 | * | 9/2016 | Black ...................... | B44C 5/00 |
| 2002/0129763 A1 | * | 9/2002 | Schramm ................. | B44D 3/00 118/13 |
| 2006/0076101 A1 | * | 4/2006 | Krivich ................. | B44C 1/1712 156/86 |
| 2007/0210594 A1 | * | 9/2007 | Wong .................... | B44D 2/002 294/14 |
| 2010/0065208 A1 | * | 3/2010 | Roszak .................... | E01H 1/12 156/308.2 |
| 2018/0223103 A1 | * | 8/2018 | Schweinfurth .......... | A61Q 1/02 |

\* cited by examiner

*Primary Examiner* — Nina Bhat

(57) ABSTRACT

Safety of products should be the most important aspect in any product available to the consumer. The following product of making an Easter Egg Paste to be placed on an eggshell to eliminate dye intrusion has been improved by reducing the need for edible salts in the formulation, and eliminating the need for emulsifiers such as soy lecithin and replacing them with more edible safe ingredients.

17 Claims, No Drawings

FORMULATION TO STOP THE ADHERENCE OF A DYE TO AN EGGSHELL, IMPROVEMENT

RELATED APPLICATIONS

This application claims a Terminal Disclaimer to U.S. application Ser. No. 15/732,770 filed Dec. 26, 2017.

FIELD OF THE INVENTION

Present invention relates to the field of egg coloring, and more particularly, to food-safe materials, systems and methods for coloring eggs with multiple colors.

BACKGROUND OF THE INVENTION

Coloring eggs with multiple colors is challenging. One could put a sticker on an egg, dye that egg, remove the sticker and dye the egg in a second color and thus get a two color egg. The only problem was the original color that was utilized would now be changed.

Another approach involved the use of a wax crayon or melted wax, allowing a user to write on an egg and locally prevent dye from coloring the eggshell. This is a very inefficient approach, making it utterly impossible to achieve acceptable results.

Also, there are several approaches that utilize sugar as an adhesive, while decreasing the actual solubility of the sugar, which may have some positive results. For example, a method of producing an adhesive composition is disclosed in U.S. Pat. No. 6,613,378 to Erhan et al.

There may be products on the market that use wax or a product that is not consumer edible and thus not safe for children. Utilizing wax is difficult and not particularly safe for children to use. Vaseline or other petroleum type products might have some effectiveness, but lack the safety needed for use by children or adults for that matter.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY OF THE INVENTION

It is an object of the present embodiments to provide an easy and effective approach to dye Easter Eggs in a multitude of colors and designs.

This and other objects, advantages and features in accordance with the present embodiments may be provided by a method of making a coating for use in reducing penetration of food dyes on an egg shell surface, the method comprising: a) admixing an edible salt compound with water in combination with a hydroxide where the molar weight of hydroxide to water is in a range of 1:1 to 1:20 to form a mixture; b) optionally adding an acid to lower the pH of the mixture; c) optionally adding a sugar alcohol to the mixture; d) adding a food grade emulsifier and a fatty acid to the mixture separately or together as a combination; adding a food grade wax.

Additionally, and/or alternatively, an edible salt may include, but not limited to one or more of chloride's, sulfate's and combinations thereof.

Additionally, and/or alternatively, a sugar alcohol, may include, but not limited to one or more of glycerin, arabitol, eythritol, glycitol, lactitol, maltitol, mannitol, sorbitol, isomalt xylitol, hydrogenated starch hydrolysates (HSH) and combination thereof.

Additionally, and/or alternatively, the emulsifier of step d) may be one or more of monosaccharides, disaccharides, polysaccharides, oligosaccharides and combinations thereof.

Additionally, and/or alternatively, the method of producing a multiple colored egg may include applying the coating, and comprising: a.) applying at least one sticker to the egg shell; b.) dipping the egg in food grade food coloring of a color; c.) softening the coating and applying the coating to the egg shell; d.) removing at least one sticker; and e.) dipping the egg in food grade food coloring of a different color to produce a multicolored egg; wherein steps b) through e) are repeated as desired.

Additionally, and/or alternatively, the polyfunctional acid comprises one or more of acetic, citric, glycolic, lactic, malic, tartaric, mandelic, fumaric, and phosphoric or combinations thereof.

Additionally, and/or alternatively, the food grade wax comprises one or more of beeswax (bleached and unbleached), camuba wax, candellia wax, paraffin wax, synthetic paraffin wax, ceresin wax, rice bran wax, microcrystalline wax or other food safe wax or combinations thereof.

Additionally, and/or alternatively, the emulsifier may be at least one of monosaccharides including; glucose or dextrose, fructose, galactose, mannose, ribose and deoxyribose, disaccharides including sucrose, lactose, maltose, lsomaltulose, trehalose, trehalulose, polysaccharides including the group consisting of starches, modified starches, dextrins, maltodextrins, chondroitin, oligosaccharides and combinations thereof.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The embodiments of the present invention allow consumers to dye Easter Eggs in a multitude of colors and designs. An element preventing consumers from achieving this was the lack of a product that is able to stop the penetration of a dye to an egg shell. What was needed was to be able to apply a product (e.g. a paste) to the egg shell that would prevent the dye from penetrating the egg shell in specific areas. If such a paste is applied over an egg and sticker, for example, and the sticker removed, one could easily decorate an egg in 1, 2, 3 or more colors utilizing the egg paste and different sticker designs.

Ease of use, cleanliness, and ability to easily apply onto an egg and easily wipe off an egg are important features of the paste. Another important element is the ability to decorate eggs with clean lines without distorting those lines (e.g. with a spoon or by dropping the egg into a glass etc.). The egg paste may preferably have a stickiness to it. So when the paste is applied to an egg it acts as a glue to mildly adhere an egg to an egg holder, (e.g. an egg holder according to features of the present invention). Such an egg holder allows one to easily place the egg into a dye and remove it without touching the surface of the egg and thus potentially ruin the coloring design or allowing the egg to touch the side of a glass or container.

Safety of the "egg paste" used with the dyes is a concern. Red #3 is a very unstable die at low ph. Formulating a dye that keeps Red #3 stable may be an important concern. So, for the safety of the consumer, it may be desirable to balance the quantities of hydroxide and magnesium sulfate in the mixture. Selective emulsifiers and alternatives may also be beneficial to the consumer and overall safety of the product.

Red #3 is a dye that naturally sticks to the outside of many materials, to include many mixtures that can be utilized with the materials set forth in this and patent Ser. No. 15/732,770. With correct mixing of the materials, one can eliminate this problem and thus get a clean egg after removing from any dye that contains Red #3.

The process of making a coating which is applied to the surface of the egg shell using a fingertip, and body heat associated with using a fingertip, to apply the coating to the egg shell prevents or eliminates penetration of food dyes to an egg shell. Specifically the method of eliminating the penetration of food dyes on egg shell surface is accomplished by making a coating which includes the steps of a.) admixing, a hydroxide, a sulfate and water wherein the ratio of hydroxide to water is 1:1 to 1:20 to form a solution; b.) determining the pH and optionally adding a an acid to lower the pH of the solution; c.) adding a sugar alcohol; d.) adding a food grade emulsifier and fatty acid to the solution; e.) heating the solution to a temperature between 135-200° F. and adding a food grade wax; and f.) cooling the coating so it may be applied onto the egg shell surface to prevent color intrusion.

The specific types of edible salts in the coating may include but are not limited to the chloride's; ammonium chloride, calcium chloride, magnesium chloride, potassium chloride, sodium chloride, sulfates; ammonium sulfate, calcium sulfate, magnesium sulfate including; anhydrous, monohydrate, dihydrate, trihydrate, tetrahydrate, pentahydrate, hexahydrate, heptahydrate, enneahydrate, decahydrate, undecahydrate, potassium sulfate, potassium bisulfate, potassium persulfate, sodium sulfate, sodium bisulfate, sodium thiosulfate.

The specific types of hydroxides in the coating may include but are not limited to potassium hydroxide and sodium hydroxide and calcium hydroxide and combinations thereof.

The polyfunctional acids in making the coating may include but are not limited to all edible acids which may include citric, acetic, glycolic, lactic, malic, tartaric, mandelic, fumaric, phosphoric acids, polycarboxylic acids, dicarboxylic acids, hydroxy carboxylic acids and combination thereof.

The specific types of sugar alcohols which can be used in the coating may include but are not limited to one or more of glycerin, arabitol, eythritol, glycitol, lactitol, maltitol, mannitol, sorbitol, isomalt, xylitol, and hydrogenated starch hydrolysates (HSH) or combination thereof.

The specific types of food emulsifiers may include monoglyceride fatty acid esters including acetic acid, lactic, citric acid, succinic acid, diacetyl tartaric acid, polycerouccinic acid esters and diacetyl tartaric acid monoglyceride fatty acids. Other food grade emulsifiers include polyglycerol ester, polyglycerol poyricinoleate, sorbitate ester, polypropylene glycol, sucrose esters and lecithin, the types of lecithins contemplated include one or more of soy, milk, egg, rapeseed, cotton seed, sunflower, peanut and wheat germ. The fatty acids which are used with the emulsifier may include the following edible oils sunflower oil, soybean oil, corn oil, cottonseed oil, canola oil, coconut oil, olive oil, palm oil, peanut oil, safflower oil, sesame seed oil, sunflower oil, hazelnut oil, almond oil, cashew oil, macadamia oil, pecan oil, pistachio oil, walnut oil, lagenaria siceraria oil, buffalo gourd oil, pumpkin seed oil, watermelon seed oil, acai oil, black currant seed oil, borage seed oil, evening primrose oil, carob pod oil, apricot oil, argon oil, artichoke oil, avocado oil, babassu oil, ben oil, borneo tallow nut oil, cohune oil, coriander seed oil, hemp oil, kapok seed oil, lallemantia oil, meadowfoam seed oil, mustard oil, okra seed oil, hibiscus esculentus oil, perilla seed oil, pine nut oil, poppyseed oil, prune kernel oil, quinoa oil, ramtil oil, rice bran oil, tea oil, thistle oil, wheat germ oil, caprylic acid, capric acid, lauric acid, cyristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, a-Linolenic acid, arachidonic acid, eicosapentaenoic acid, docosahexaenoic acid and mixtures thereof.

The specific types of sugars utilized as a an emulsifier or co-emulsifier may include, but are not limited to monosaccharides; glucose or dextrose, fructose, galactose, mannose, ribose and deoxyribose, Hexoses; D- and L-allose, D- and L-altrose, D- and L-fucose, D- and L-gulose, D-sorbose, D-tagatose, Pentoses; D- and L-arabinose, D- and L-lyxose, Rhamnose, D-ribose, Ribulose and its synthetic form sucroribulose, D-xylose or wood sugar, Tetroses; D- and L-erythrose, Erythrulose, D- and L-threose, the disaccharides; sucrose, lactose, maltose, isomaltose, Isomaltulose, trehalose, trehalulose, polysaccharides; starch; amylose and amylopectin of one or more of rice, wheat, maize potatoes, cassava, acorns, arrowroot, arracacha, bananas, barley, breadfruit, buckwheat, canna, colocasia, katakuri, kudzu, malanga, millet, oats, oca, polynesian arrowroot, sago, sorghum, sweet potatoes, rye, taro, chestnuts, water chestnuts, yams, favas, lentils, mung beans, peas, and chickpeas, modified starch; dextrin roasted starch, acid treated starch, alkaline treated starch, bleached starch, oxidized starch, enzyme-treated starch, monostarch phosphate, distarch phosphate, phosphated distarch phosphate, acetylated distarch phosphate, starch acetate, acetylated distarch adipate, hydroxypropyl starch, hydroxypropyl distarch phosphate, starch sodium octenylsuccinate, acetylated oxidized starch, dextrins; including all mixtures of polymers of D-glucose units linked by α-(1→4) or α-(1→46) glycosidic bonds, maltodextrin, including all composed of 3 to 19 D-glucose (dextrose) molecules, linked by alpha (1-4) bonds, chondroitin sulfate; glycosaminoglycan, a polysaccharide composed of the amino sugar N-acetylgalactosamine and glucuronic acid, oligosaccharides; Arabinoxylan-oligosaccharides, Fructo-oligosaccharides (FOS) or oligofructose, Galacto-oligosaccharides (GOS): raffinose, stachyose and verbascose, soybean oligosaccharides, transgalactooligosaccharides (TOS), Gentio-oligosaccharides, Gluco-oligosaccharides, Human milk oligosaccharides (HMO), lsomalto-oligosaccharides, Lactosucrose, Maltotriose, Mannan-oligosaccharides, Melibiose-derived oligosaccharides, N-acetylchito-oligosaccharides, Pectic oligosaccharides, Xylo-oligosaccharides and combinations thereof.

The specific types of food grade waxes may include, but are not limited to waxes from animal waxes; beeswax, spermaceti, vegetable waxes; candelilla wax, carnauba wax, rice bran wax, soy wax, mineral waxes; Ceresin waxes, petroleum waxes; paraffin wax, microcrystalline wax or combination thereof.

The specific waxes utilized can be wide and varied, picked for their softness or hardness and specific melting points. A concern would be the melting point, with increased costs associated with combining ingredients at higher temperature, burning of the wax, increased probability of precipitating certain ingredients, increased incidence of air infiltration into the wax in the form of bubbles etc. For these reasons a wax that melts under 175 degrees would be preferable, but not necessary.

A blend of materials utilizing Water, Sodium Hydroxide, Magnesium Sulfate are blended then Maltitol may be added together to form a stable emulsion with slight heat added to blend the maltitol. A preferred method utilizing Honey as an emulsifier to be able to incorporate several fatty acids as Coconut oil or similar is then added. Heat is then added to incorporate the wax material with Unbleached Beeswax as a preferred ingredient. Blending temperatures should remain as low as possible at around 160 degrees F. to prevent any burning of the wax or honey.

One can also look at many materials to replace honey that also will function as an emulsifier in this material such as High Fructose Corn Syrup or Corn Syrup which offers a less expensive alternative than Honey.

Example 1

We added 1.5% Sodium Hydroxide (50/50 in water) along with 1.0% Water and mixed, then added 3% Magnesium Sulfate Heptahydrate and mixed until fully incorporated. We then added 1.13% Maltitol adding heat at around 50 degrees C. to fully incorporate into the mix. Coconut oil at 27% was then added along with 39.47% High Fructose Corn Syrup and stirred until fully incorporated. 26.9% unbleached beeswax was then added into the mix and the temperature was raised to 65 degrees C. until fully blended.

A goal of the invention is to soften the wax in the mix and to be able to increase the amount of wax in an individual mix, thus increasing the effectiveness of the product as a whole, and increasing the barrier between the eggshell and a dye.

In Example 1, it gives one form of the wax that can be adjusted for feel by adding additional/less wax in the form of beeswax or other edible wax, or increasing or decreasing the fatty acid including coconut oil, lauric acid, myristic acid, palmitic acid or similar or choosing to utilize a monosaccharide as glucose instead of honey, depending on whether a stiffening or a loosening of the material is required.

One can also look at the water content utilized in the sugar syrups as in the HFCS or similar or using a different emulsifying agent as Soy Lecithin. The addition of maltitol or similar sugar alcohol in a lesser or more degree has a distinct effect on the spreadability of the wax as does the specific polyfunctional acid utilized and the amount. One can also delve into the immense possibilities of the admixtures of the sugars and polyfunctional acids (e g. U.S. Pat. No. 6,613,378 to Erhan at al).

The requirements of an effective wax are truly vast, given the ingredients added in the mix trying to achieve similar results. There may be many possible combinations that arise out of these potential ingredients, geared to a single outcome, namely a wax to resist an egg dye, which is easily applied and removed while providing some adhesiveness to allow the egg to be attached to an egg dipper an eliminate the egg falling off the device.

One preference of formulating this egg paste is the resistance to pull away one's finger from the egg and in essence pull some of the wax away from the surface of the egg. In essence, allowing a path for the dye to seep on the egg. The present array of contemplated formulations use the ingredients to eliminate this action from occurring.

Another aspect of the wax, it may be formulated to have glue like qualities. This may be important in view of the innovative egg holder (by the present inventor) that may be combined alongside with the egg paste. Such an egg holder may rely on the adhesive qualities of the egg paste to hold an egg onto its egg stand. The qualities of the wax, may actually allow a user to turn the egg holder on its side and even upside down, without the egg falling off of the egg stand. Without the qualities of the wax possessing adhesive qualities, the egg would easily fall off the egg stand and damage one's colored egg creation, such as a "Color Me Cool Egg" design!

The formulation shown, does not necessarily need a food grade preservative or combination of, to provide a product free of fungus and microbial growth. There are formulations that could require microbial growth and fungus protection given the degree of water incorporated and polyfunctional acids utilized, and the addition of the admixture containing sugar and polyfunctional acids. A number of different preservatives may be used depending on the final formulation of the egg paste and pH, not limited to sorbates, benzoates, sulfites, butylated hydroxytoluene and natural preservatives.

Also, it should be noted that the list of ingredients in step d) can be added individually or in any combination as desired. For the sugars, syrups can be used or dry versions (i.e. sugar solids) with the addition of water.

As described above, the method of producing a multiple colored egg may include applying the coating, and comprising: a.) applying at least one sticker to the egg shell; b.) dipping the egg in food grade food coloring of a color; c.) softening the coating and applying the coating to the egg shell; d.) removing the at least one sticker; and e.) dipping the egg in food grade food coloring of a different color to produce a multicolored egg; wherein steps b) through e) are repeated as desired.

The embodiments described above provide for the making of a paste that can be applied to an egg to prevent dye from penetrating the covered parts of the egg. In combination with stickers or other attachable designs, the egg artist can selectively customize the egg coloring process with ease. The coatings or pastes of the invention are food safe and edible.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from FIGURE to FIGURE, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention.

In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

What is claimed is:

1. A method of making a coating for reducing penetration of food dyes on an egg shell surface, the method comprising:
   a.) admixing, a hydroxide, an edible salt and water wherein the ratio of hydroxide to water is 1:1 to 1:20 to form a solution;
   b.) determining the pH level of the solution and optionally adding an acid to lower the pH of the solution;
   c.) optionally adding a sugar alcohol to the solution and heating; if;
   d.) adding a food grade emulsifier and fatty acid separately or together as;
   e.) heating the solution to a temperature between 135-220*F and adding a food grade wax; and
   f.) cooling the solution to produce the coating for application onto the egg shell surface.

2. The method of claim 1, wherein said edible salt is selected from the group consisting of acetates, carbonates, chlorides, citrates, nitrates, nitrites, oxides, phosphates, sulfates, sulfites and combinations thereof.

3. The method of claim 1, wherein said edible salt is selected from the group consisting of chlorides and sulfates and combinations thereof.

4. The method of claim 1, wherein said edible salt is selected from the group consisting of magnesium sulfate, sodium sulfate, potassium sulphate, magnesium chloride, calcium chloride, sodium chloride, potassium chloride and combinations thereof.

5. The method of claim 1, wherein said sugar alcohol is selected for the group consisting of 3-carbon, 4-carbon, 5-carbon, 6 carbon 7 carbon and 12carbon sugars and combinations thereof.

6. The method of claim 1, wherein said food grade emulsifier is selected from the group consisting of monosaccharides, disaccharides, polysaccharides, oligosaccharides, hone and combinations thereof.

7. The method of claim 6, wherein the monosaccharides are selected from the group consisting of glucose, dextrose, fructose, galactose, mannose, ribose and deoxyribose, hexoses, pentose's, ribulose, sucroribulose, d- xylose, tetroses, erythrulose and combinations thereof.

8. The method of claim 6, wherein the disaccharides are selected from the group consisting of sucrose, lactose, maltose, isomaltose, Isornaltulose, trehalose, trehalulose and combinations thereof.

9. The method of claim 6, wherein the polysaccharides are selected from the group consisting of starches, modified starches, dextrins, maltodextrins, chondroitin sulfate and combinations thereof.

10. The method of claim 6, wherein the polysaccharides are selected from the dextrins, maltodextrins and combinations thereof.

11. The method of claim 6, wherein the honey is selected from the group consisting of monofloral, polyfloral, blended, pasteurized, raw, strained and filtered honey.

12. The method claim 1, wherein said food grade emulsifier comprises 5-50% by weight of water.

13. The method of claim 1, wherein said hydroxide is selected from the group consisting of potassium hydroxide, sodium hydroxide, calcium hydroxide and combinations thereof.

14. The method of claim 6, wherein the monosaccharides is selected from the group consisting of glucose syrup and fructose syrup and combinations thereof.

15. The method of claim 6, wherein the disaccharides is selected from the group consisting of sucrose syrup, maltose syrup and combinations thereof.

16. The method claim 6, wherein the polysaccharides is selected from the group consisting of cellulose syrup, glycogen syrup and combinations thereof.

17. The method claim 6, wherein said food grade emulsifier is filtered honey.

\* \* \* \* \*